United States Patent
Dutta

(10) Patent No.: US 10,828,721 B2
(45) Date of Patent: Nov. 10, 2020

(54) NOZZLE WITH LASER SCANNING HEAD FOR DIRECT METAL DEPOSITION

(71) Applicant: DM3D Technology, LLC, Auburn Hills, MI (US)

(72) Inventor: Bhaskar Dutta, Troy, MI (US)

(73) Assignee: DM3D TECHNOLOGY, LLC, Auburn Hills, MI (US)

( * ) Notice: Subject to any disclaimer, the term of this patent is extended or adjusted under 35 U.S.C. 154(b) by 294 days.

(21) Appl. No.: 15/752,396

(22) PCT Filed: Aug. 13, 2016

(86) PCT No.: PCT/US2016/046941
§ 371 (c)(1),
(2) Date: Feb. 13, 2018

(87) PCT Pub. No.: WO2017/031015
PCT Pub. Date: Feb. 23, 2017

(65) Prior Publication Data
US 2018/0326539 A1 Nov. 15, 2018

Related U.S. Application Data

(60) Provisional application No. 62/205,361, filed on Aug. 14, 2015.

(51) Int. Cl.
*B23K 26/34* (2014.01)
*B23K 26/08* (2014.01)
(Continued)

(52) U.S. Cl.
CPC ............ *B23K 26/34* (2013.01); *B23K 26/082* (2015.10); *B23K 26/0876* (2013.01); *B22F 7/00* (2013.01); *B33Y 10/00* (2014.12)

(58) Field of Classification Search
CPC ........ B23K 26/06; B23K 31/12; B23K 26/34; B23K 26/20; B23K 26/260876;
(Continued)

(56) References Cited

U.S. PATENT DOCUMENTS

2005/0133527 A1 6/2005 Dullea et al.
2009/0206065 A1 8/2009 Kruth et al.
(Continued)

FOREIGN PATENT DOCUMENTS

WO 2017025148 A1 2/2017

OTHER PUBLICATIONS

International Search Report for related WO Application No. PCT/US2016/046941, dated Nov. 2, 2016.

*Primary Examiner* — David J Walczak
(74) *Attorney, Agent, or Firm* — Warner Norcross + Judd LLP

(57) ABSTRACT

An apparatus for performing direct material deposition upon a substrate for generating a three dimensional object includes a motion system for moving an head. The head includes a laser for generating a laser beam and a laser scanner for directing the laser beam at the substrate for generating a melt pool at the substrate. A nozzle delivers material into the melt pool generated by the laser beam for forming a bead of material upon the substrate. The laser scanner is cooperable with the motion system, which is moveable along a first path while the laser scanner is simultaneously moveable along a second path for progressively generating a bead of material deposited upon the substrate.

16 Claims, 3 Drawing Sheets

(51) Int. Cl.
*B23K 26/082* (2014.01)
*B33Y 10/00* (2015.01)
*B22F 7/00* (2006.01)

(58) Field of Classification Search
CPC ....... B23K 26/082; B29C 67/00; B22F 3/105; B22F 7/00; B33Y 10/00
See application file for complete search history.

(56) References Cited

U.S. PATENT DOCUMENTS

| | | |
|---|---|---|
| 2013/0142965 A1 | 6/2013 | Bruck et al. |
| 2014/0202997 A1 | 7/2014 | Vadali et al. |
| 2014/0259659 A1 | 9/2014 | Kleinert |
| 2015/0090074 A1 | 4/2015 | Etter et al. |
| 2015/0174699 A1 | 6/2015 | Bruck et al. |

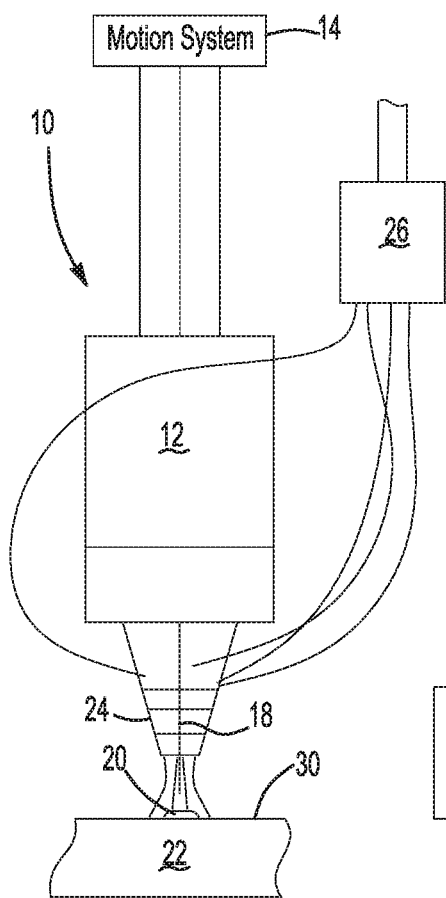
Fig-1
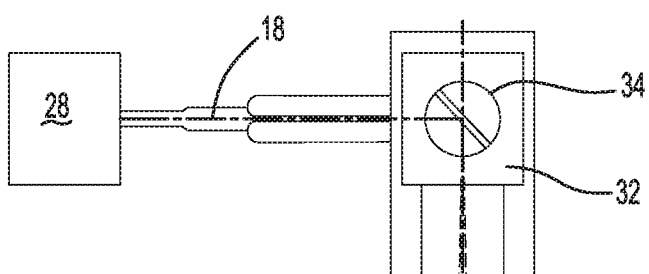
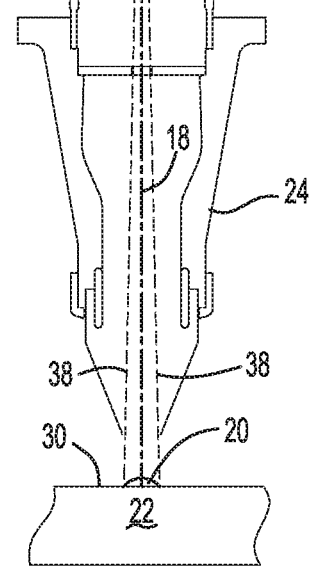
Fig-2

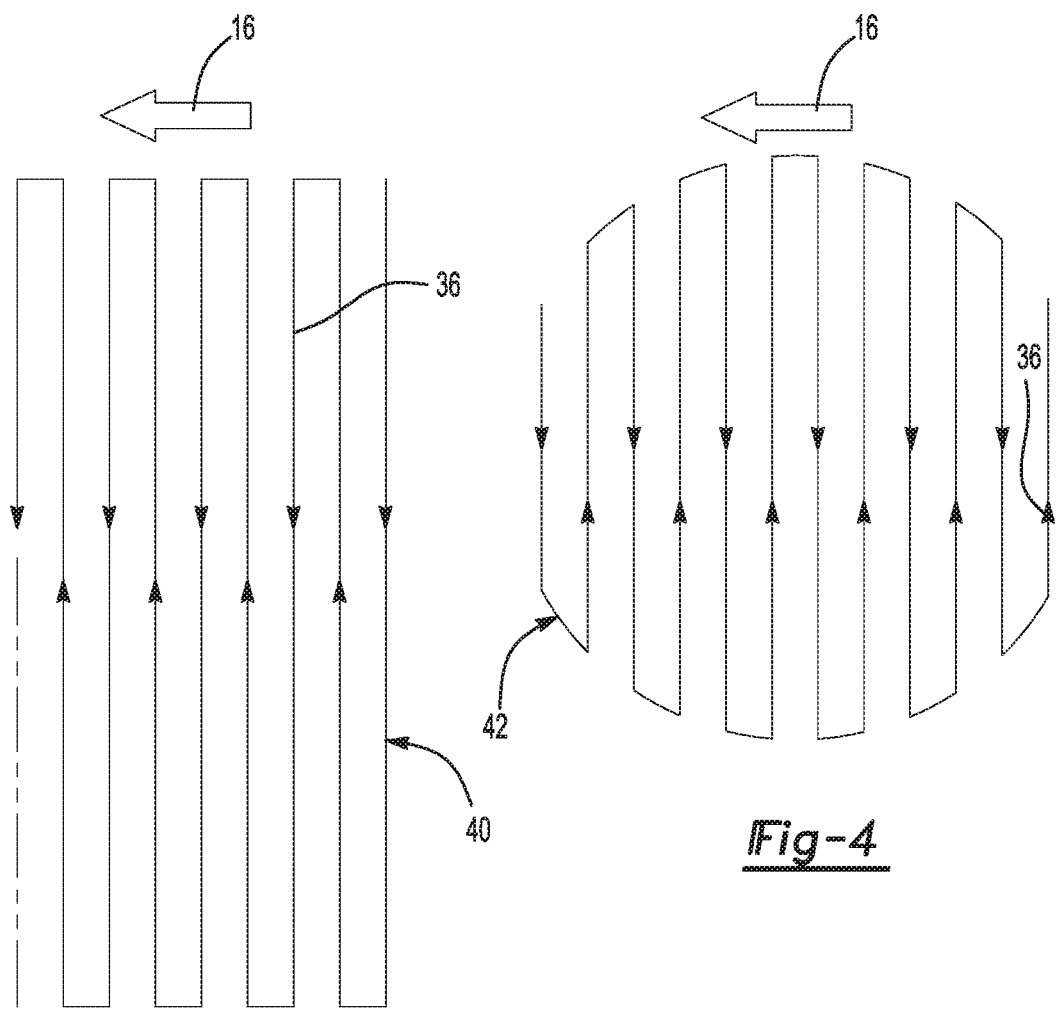

NOZZLE WITH LASER SCANNING HEAD FOR DIRECT METAL DEPOSITION

PRIOR APPLICATIONS

The present application is the National Stage application claiming benefit of International Patent Application No. PCT/US2016/046941 filed Aug. 13, 2016, which claims priority to U.S. provisional patent application No. 62/205,361 filed on Aug. 14, 2015.

TECHNICAL FIELD

The present invention relates generally toward an improved method and apparatus for performing direct material deposition. More specifically, the present invention relates toward the use of a laser scanner in a direct material deposition process to enhance process speed and reduce energy consumption.

BACKGROUND

Direct material deposition has proven a viable manufacturing process. Direct material deposition is a type of additive manufacturing that makes use of a laser to form a melt pool upon a metallic substrate into which powder or wire is deposited that when cooled alters the geometric configuration of a workpiece. Presently, a large laser spot size, approaching a desired size of a melt pool is used. As a laser spot size increases, higher power consumption is required to provide necessary heat to form the melt pool. For example, it is not uncommon that power input to a laser exceeds 6 to 8 kW to form, for example, a 3 mm by 15 mm rectangular melt pool. In addition, forming differently configured melt pools such as, for example, square, rectangular, and oval has proven problematic requiring complicated adjustment be made to the associated optics.

As a result of these limitations, the use of direct material deposition to manufacture large components has proven exceedingly expensive, and therefore not commercially viable in many instances. Therefore, it would be desirable to develop a direct material deposition process capable of manufacturing large workpieces in a cost-effective manner and reduced power requirements.

SUMMARY

A method of performing direct material deposition upon a substrate includes the use of a process head having a laser scanner for projecting a laser beam. The laser beam is directed by the laser scanner to create a melt pool upon the substrate. A nozzle delivers material into the melt pool generated by the laser beam. The process head is mounted upon a motion system that moves the process head along a first path. A controller is provided that is programmable for directing the motion system to move along the first path and for directing the laser scanner to trace a second path with the laser beam. The controller directs the motion system to move along the first path while simultaneously directing the laser scanner to trace the second path for forming a melt pool along the second path. Material is fed into the melt pool for forming a bead of the material onto the substrate by direct material deposition.

Movement of the motion system and the laser scanner is coordinated so the laser tracing the second path generates a bead of material from the powder material fed into the melt pool simultaneously with the motion system moving the process head. The speed of the laser scanner and infusion rate of the powder material used to generate a bead of material is adjusted to produce a desirable geometric configuration of material upon the substrate.

The use of a laser scanner in combination with a motion system and a nozzle provides a significant enhancement to the direct material deposition process. The laser scanner now provides rapid movement of a laser beam to trace the desired footprint of a melt pool simultaneously with the motion system moving the process head along a first path. It is believed that the power requirement of the laser can be reduced to as low as 400 watts from a current 6 to 8 kW power requirement with the use of the laser scanner focusing a narrow laser beam on a substrate to form a desired melt pool. In addition, the laser scanner provides the ability to form different shaped melt pool upon a substrate without having to modify a processing head by changing lenses and the like. The laser scanner now merely traces a desired configuration of a melt pool.

BRIEF DESCRIPTION OF THE DRAWINGS

Other advantages of the present invention that will be readily appreciated as the same becomes better understood by reference to the following detail description when considered in connection with the accompanying drawings, wherein:

FIG. 1 shows a schematic view of the assembly of the present invention;

FIG. 2 shows a schematic view of the process head of the present invention;

FIG. 3 shows a second path generated by a laser scanner;

FIG. 4 shows a further second path generated by the laser scanner, and

DETAILED DESCRIPTION

Figure 5:
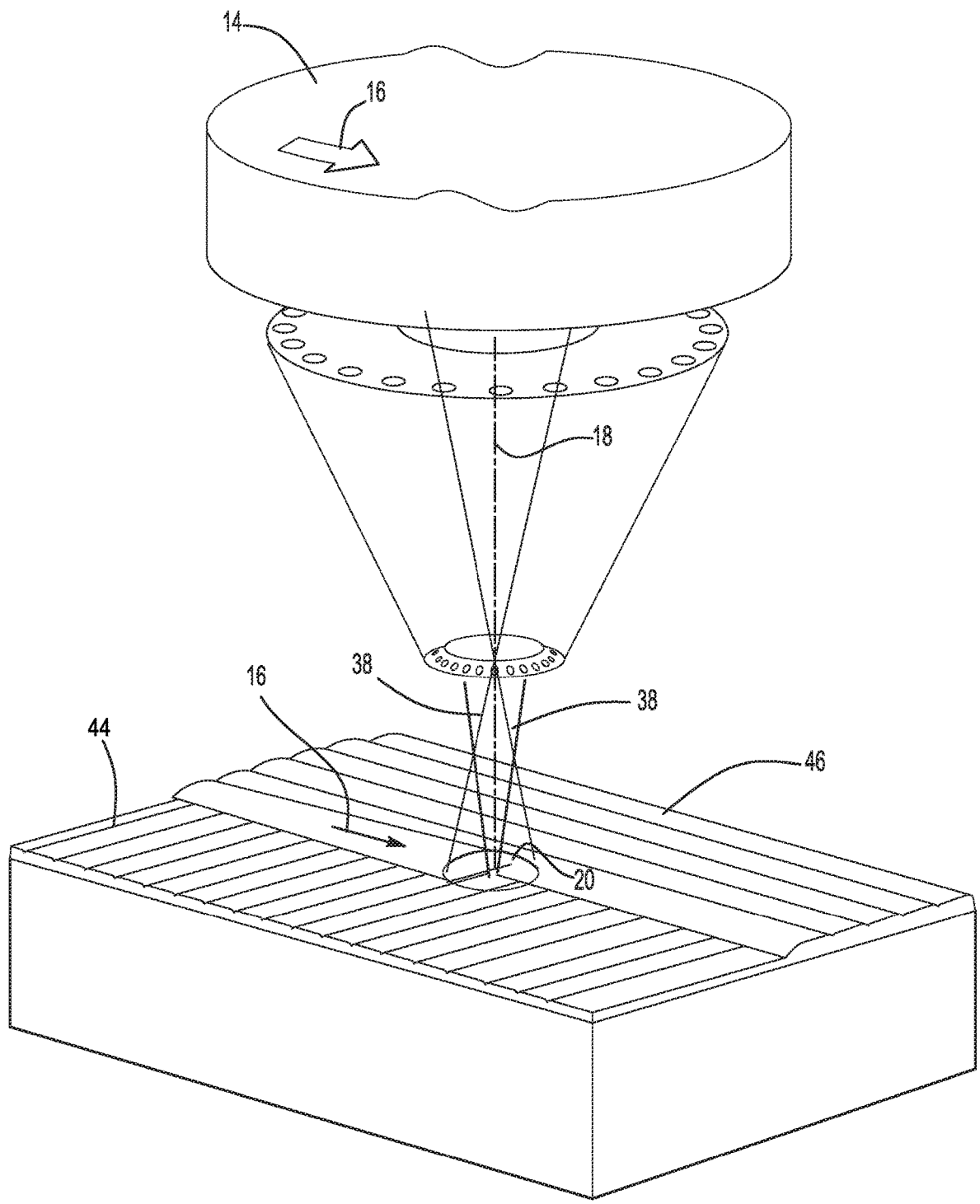
FIG. 5 shows a process head moving along a first tool path.

Referring to FIG. 1, a schematic of the apparatus of the present invention is generally shown at 10. A process head 12 is mounted to a motion system 14. The motion system 14 takes the form of a multi-access robot arm, a linear two axis car, or other equivalent device capable of moving the process head 12 along a first path identified by arrow 16 (FIGS. 3-5).

The process head 12 generates a laser beam 18 in a manner explained further herein below. The laser beam 18 develops a melt pool 20 upon a workpiece 22 using a closed loop process in the manner set forth in U.S. Pat. No. 6,925,346, the contents of which are incorporated herein by reference. A nozzle 24 directs material such as, for example, powdered metal, powder ceramics, wire, and tape, received from a material source 26 into the melt pool 20.

As best represented in FIG. 2, the process head 12 includes a laser source 28 such as, for example, an optical fiber, a diode laser, and equivalents capable of producing a laser beam having enough energy to form a melt pool upon a substrate 30 of the workpiece 22. As will be appreciated, the invention of the present application significantly reduces the amount of energy required to generate a melt pool 20 upon the substrate 30 of the workpiece 22.

A scanner 32 includes a first galvanometer 34 used to redirect the laser beam 18 generated by the laser source 28 to the substrate 30 of the workpiece 22. The scanner 32 by way of the galvanometer 34 rapidly moves the laser beam 18 to trace a second path 36. Therefore, it should be understood that while the motion system 14 moves the process head 12 along the first path 16, the galvanometer 34 causes the laser beam 18 to trace a second path 36. The diameter of the laser beam 18 is significantly narrower than that of the melt pool 20 allowing a significant reduction in the amount of energy necessary to form the melt pool 20. For example, the laser beam 18 can have a diameter of between about 50 μm and 500 μm, and the melt pool 20 can have a diameter of between about 0.1 mm and 25 mm. Also by example, the ratio of laser beam diameter to melt pool diameter can be between about 0.5 to 0.02. As such, to generate a desired footprint of the melt pool 20, the galvanometer 34 of the scanner 32 traces the desired footprint of the melt pool 20 as identified by dashed lines 38 shown in FIG. 2. It should be understood that two or more galvanometers 34 may be included within the scanner 32 to further enhance the ability of the scanner 32 to trace the desired second path 36 and that the use of two galvanometers is within the scope of this invention.

As set forth above, a nozzle 24 is mounted upon a motion system 14 taking the form of a five axis robotic arm or two axis head (not shown). A five axis robotic arm provides the ability to move the nozzle 24 along a full spectrum of the workpiece 22 even over non-horizontal surfaces. Further facilitating the ability to move the nozzle 24 along a desired path is the delivery of material as set forth above to either coaxial or side delivery nozzle 24. Examples of nozzles suitable for this type of material delivery are disclosed in U.S. Pat. Nos. 6,423,926 and 6,534,745, the contents of which are included herein by reference.

Exemplary of the method of the present invention, FIG. 3 shows a schematic of a rectangular melt pool 40. In this embodiment, the rectangular melt pool 40 grows along the first path 16 as directed by the motion system 14 (FIG. 1). It should be understood that the rate at which the melt pool 40 grows is dictated by a speed of the motion system 14 along the first path 16. Simultaneously, the laser scanner 32 directs the laser beam 18 to trace the second path 36. As such, the laser beam 18 traces multiple passes within a desired configuration of the melt pool 40 while the motion system 14 moves along the first path 16. As set forth above, as the rectangular melt pool 40 develops, material is fed into the melt pool via the nozzle 24. To achieve multiple passes within the rectangular melt pool 40, the scanner speed, in this embodiment, moves about fifteen m/s, which is significantly faster than the motion system 14 moves the process head 12 along the first path 16. Further by example, the laser scanner 32 can have a scanning speed of between 5 m/sec and 20 m/sec, and the melt pool 40 can advance at a speed of between 0.1 mm/min to 5 mm/min. The ability to move at a high rate of speed enables a low power narrow width laser beam to be used operating at about 400 W, significantly reducing an amount of energy required to generate a melt pool. The actual power requirement is dictated, in part, by the substrate of the workpiece 22 and the speed the first path 16 is traversed.

The benefits of incorporating the laser scanner 32 into the process head 12 is again represented in FIG. 4. In this embodiment, it is desirable to form a circular melt pool 42. In a similar manner as set forth above, the motion system 14 moves the head 12 along the first path 16 while the laser scanner 32 directs the laser beam 18 to trace the second path 36 within the circular melt pool 42. It should be apparent to those of ordinary skill in the art that virtually any shape or configuration of melt pool may now be developed by virtue of the laser scanner 32 tracing any predetermined path 36 while the motion system 14 moves the process head 12 along the first path 16.

To achieve a desired configuration of a workpiece 22 a novel method is developed that makes full use of the ability of the laser scanner 34 to achieve a desirable melt pool 20, 40, 42. Thus, the desired workpiece 22 geometry is analyzed and a desired melt pool size and shape is predetermined. The laser scanner 34 is programmed to create the desired melt pool 20, 40, 42 by repeating a trace along the second path 36 throughout the processing cycle. Computer-Aided Manufacturing (CAM) software is programmed into a controller (not shown) and is used to create the desired tool path or first path 16 that takes into account the melt pool 20, 40, 42 size, shape and rate of growth, the controller being programmable with a digital version of the desired three dimensional object. Tool path (first path 16) and scanner processing data are used to develop the second path 36 to cooperatively perform direct material deposition and fabricate the workpiece 22 in sequential layers at a significantly reduced energy from prior art systems.

As best represented in FIG. 5, the first path 16 is programmed into the apparatus 10 to deposit a first layer of material 44 onto the substrate 30 and to subsequently deposit a second layer of material 46 over the first layer material 44. In this embodiment, the first path 16 is traversed in sequential steps and is perpendicular when depositing the first layer material 44 and the second layer of material 46. Multiple layers of material are sequentially deposited to generate a desired three dimensional configuration of the workpiece It should be understood that the nozzle 24 is moved with the motion system 14 along a first path 16. However, the laser scanner 32 (FIG. 1) (FIG. 1 moves the laser beam 18 along the second path 36 independent of the nozzle 24. Therefore, while the laser beam 18 traces the melt pool 20 along the second path 36, the nozzle 24 is relatively stationary over the melt pool 20 moving only at the rate of the speed of the motion system 14 traversing the first path 16. As such, the stream of material is coordinated with the melt pool 20 formation and not movement of the laser beam 18 along the second path 36.

The invention has been described herein in an illustrative manner, and it is to be understood that the terminology which has been used is intended to be in the nature of words of description rather than of limitation. Obviously, any modifications and variations of the invention are possible in light of the above teachings. It is therefore, understood that within this specification the reference numerals are merely for convenience, and are not to be in any way limiting, so that the invention may be practiced otherwise than is specifically described.

What it claimed is:

1. A method of performing direct material deposition upon a substrate, comprising the steps of:

providing a process head including a laser scanner for projecting a laser beam thereby creating a melt pool upon the substrate and providing a nozzle for delivering a powder material;

mounting said process head upon a motion system for moving said process head along a first path;

providing a controller being programmable for directing said motion system to move said process head along the first path and for directing said laser scanner to trace the laser beam laterally along a second path, at least a portion of the second path being perpendicular to the first path in alternating directions;

said controller directing said motion system to move said process head along the first path and directing said laser scanner to simultaneously trace the laser beam along the second path thereby forming the melt pool along the second path, such that the melt pool is wider than a diameter of the laser beam;

causing said nozzle to deliver the powder material into the melt pool for performing direct material deposition onto the substrate;

coordinating movement of said motion system with said laser scanner wherein said laser scanner traces the laser beam along the second path while said motion system moves said laser scanner along the first path for generating a first additive layer on the substrate.

2. The method set forth in claim 1, further including the step of adjusting a speed of said laser scanner and an infusion rate of the powder material for generating the first additive layer, thereby forming an object having a three-dimensional configuration.

3. The method set forth in claim 1, wherein the laser beam includes a beam diameter and the melt pool includes a pool diameter greater than the beam diameter.

4. The method set forth in claim 1, wherein the laser beam has a diameter of between about 50 μm and 500 μm and the melt pool has a diameter of between about 0.1 mm and 25 mm.

5. The method set forth in claim 1, wherein a ratio of laser beam diameter to melt pool diameter is between about 0.5 to 0.02.

6. The method set forth in claim 1, wherein said laser scanner has a scanning speed of between 5 m/sec and 20 m/sec and said melt pool advances at a speed of between 0.1 mm/min to 5 mm/min.

7. The method set forth in claim 1, further including depositing a second additive layer over said first additive layer with the second additive layer being deposited in a direction perpendicular to a direction of deposition of the first additive layer.

8. An apparatus for performing direct material deposition upon a substrate for generating a three dimensional object, comprising:

a motion system;

a process head including a laser for generating a laser beam and a laser scanner for directing said laser beam at the substrate for generating a melt pool at the substrate; and a nozzle for delivering powder material into the melt pool generated by said laser beam for forming a bead of material upon the substrate;

said process head being moveable by said motion system along a first path and said laser being controllable by said laser scanner to simultaneously trace the laser beam laterally along a second path that is perpendicular to the first path in alternating directions for progressively generating the melt pool, the melt pool being wider than a diameter of the laser beam for the formation of a first additive layer upon said substrate.

9. The apparatus set forth in claim 8, including a controller being programmable with a digital version of the three dimensional object for directing movement of the motion system and the laser scanner for producing the three dimensional object from a plurality of layers of material deposited into said melt pool.

10. The apparatus set forth in claim 8, wherein said motion system is moveable at a first speed and said laser scanner is moveable at a second speed with said second speed being greater than said first speed.

11. The apparatus set forth in claim 8, wherein said laser scanner is configured for adjusting a size and a shape of said melt pool.

12. The apparatus set forth in claim 8, wherein said laser scanner is configured for adjusting a size and a shape of said melt pool while generating said melt pool at said substrate.

13. The apparatus set forth in claim 8, wherein said laser beam generated by said laser is movable relative to said nozzle by said laser scanner.

14. The apparatus set forth in claim 8, wherein said laser beam generated by said laser includes a diameter between about 50 μm and 500 μm.

15. The apparatus set forth in claim 8, wherein said laser includes a laser power of about 400 W.

16. The apparatus set forth in claim 8, wherein said laser scanner is configured for moving said laser beam in a plurality of directions within the melt pool generated at the substrate.

* * * * *